(12) United States Patent
Jeong et al.

(10) Patent No.: US 10,135,296 B2
(45) Date of Patent: Nov. 20, 2018

(54) COIL STRUCTURE FOR WIRELESS POWER TRANSMISSIONS AND WIRELESS POWER TRANSMITTER INCLUDING THE SAME

(71) Applicant: Samsung Electro-Mechanics Co., Ltd., Suwon-si (KR)

(72) Inventors: In Wha Jeong, Suwon-si (KR); Jong Heum Park, Suwon-si (KR); Hugh Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 244 days.

(21) Appl. No.: 15/049,717

(22) Filed: Feb. 22, 2016

(65) Prior Publication Data

US 2016/0365190 A1  Dec. 15, 2016

(30) Foreign Application Priority Data

Jun. 9, 2015  (KR) .................. 10-2015-0081066

(51) Int. Cl.
| | |
|---|---|
| H01F 27/36 | (2006.01) |
| H01F 27/38 | (2006.01) |
| H02J 7/02 | (2016.01) |
| H02J 50/10 | (2016.01) |
| H01F 38/14 | (2006.01) |
| H02J 50/40 | (2016.01) |

(52) U.S. Cl.
CPC ............ *H02J 50/10* (2016.02); *H01F 27/365* (2013.01); *H01F 27/38* (2013.01); *H01F 38/14* (2013.01); *H02J 7/025* (2013.01); *H02J 50/40* (2016.02)

(58) Field of Classification Search
CPC ........... H01F 38/14; H02J 5/005; H02J 7/025; H02J 17/00; H02J 50/10; H02J 50/12; H02J 50/40; H04B 5/0037; H04B 5/0075; H04B 5/0081; H04B 5/0087
USPC ....................................... 307/104
See application file for complete search history.

(56) References Cited

U.S. PATENT DOCUMENTS

| | | | | |
|---|---|---|---|---|
| 6,047,214 A | * | 4/2000 | Mueller | .............. A61N 1/08 |
| | | | | 607/61 |
| 9,698,632 B2 | * | 7/2017 | Davison | .............. H02J 50/60 |
| 2011/0084652 A1 | * | 4/2011 | Julstrom | .............. H02J 7/025 |
| | | | | 320/108 |

(Continued)

FOREIGN PATENT DOCUMENTS

| | | |
|---|---|---|
| JP | 2010-267917 A | 11/2010 |
| JP | 2014-90606 A | 5/2014 |

(Continued)

OTHER PUBLICATIONS

Korean Office Action dated Jun. 8, 2016 in counterpart Korean Application No. 10-2015-0081066 (5 pages in English, 5 pages in Korean).

*Primary Examiner* — Levi Gannon
(74) *Attorney, Agent, or Firm* — NSIP Law (57) ABSTRACT

A coil structure for wireless power transmissions includes: a body having a cylindrical shape; an upper transmission coil formed on the body and configured to generate an electromagnetic field passing through an upper surface of the body; and at least one side transmission coil formed on the body and configured to generate an electromagnetic field passing through a side surface of the body.

16 Claims, 12 Drawing Sheets

(56) References Cited

U.S. PATENT DOCUMENTS

| | | | |
|---|---|---|---|
| 2011/0188677 A1* | 8/2011 | Rothkopf | H02J 7/00 |
| | | | 381/150 |
| 2011/0254378 A1* | 10/2011 | Ichikawa | B60L 5/005 |
| | | | 307/104 |
| 2012/0169278 A1 | 7/2012 | Choi et al. | |
| 2013/0278207 A1 | 10/2013 | Yoo | |
| 2013/0293025 A1* | 11/2013 | Xu | H02J 17/00 |
| | | | 307/104 |
| 2016/0197511 A1* | 7/2016 | Atasoy | H02J 7/025 |
| | | | 307/104 |
| 2016/0322156 A1* | 11/2016 | Yeh | H02J 5/005 |
| 2016/0322849 A1* | 11/2016 | Yeh | H01Q 7/00 |

FOREIGN PATENT DOCUMENTS

| | | |
|---|---|---|
| KR | 10-2012-0078995 A | 7/2012 |
| KR | 10-2013-0118413 A | 10/2013 |

* cited by examiner

CONVENTIONAL

FIG. 1A

CONVENTIONAL

COIL STRUCTURE FOR WIRELESS POWER TRANSMISSIONS AND WIRELESS POWER TRANSMITTER INCLUDING THE SAME

CROSS-REFERENCE TO RELATED APPLICATION(S)

This application claims the benefit of Korean Patent Application No. 10-2015-0081066 filed on Jun. 9, 2015 in the Korean Intellectual Property Office, the entire disclosure of which is incorporated herein by reference for all purposes.

BACKGROUND

1. Field

The following description relates to a wireless power transmitter.

2. Description of Related Art

Currently, in the field of smart watches technological development trends include applications of low power Bluetooth™ communications, low power displays, low power mobile processors, batteries having improved levels of performance, and the like, in terms of hardware, as well as the simultaneous development of power management software capable of minimizing power consumption.

However, since battery capacity may be insufficient due to limited internal space in smart watches, frequent charging of smart watches is a significant restriction on extending related markets. To secure waterproof and dustproof performance in smart watches, it is believed that the introduction of a wireless charging solution capable of allowing for the removal of a universal serial bus (USB) connector from charging, as opposed to an existing wired charging scheme using a USB connector, will be very effective in broadening the market for such devices.

Although many smart watch development companies are currently attempting to employ wireless charging technology, commercialization of wireless charging technology is somewhat insufficient due to a mechanical appearance of smart watches which may be caused by the wireless charging technology, a small degree charging freedom, and low charging efficiency. It is also difficult to mount a reception (Rx) coil and a related circuit in a small internal space of a smart watch.

Figure 1A:
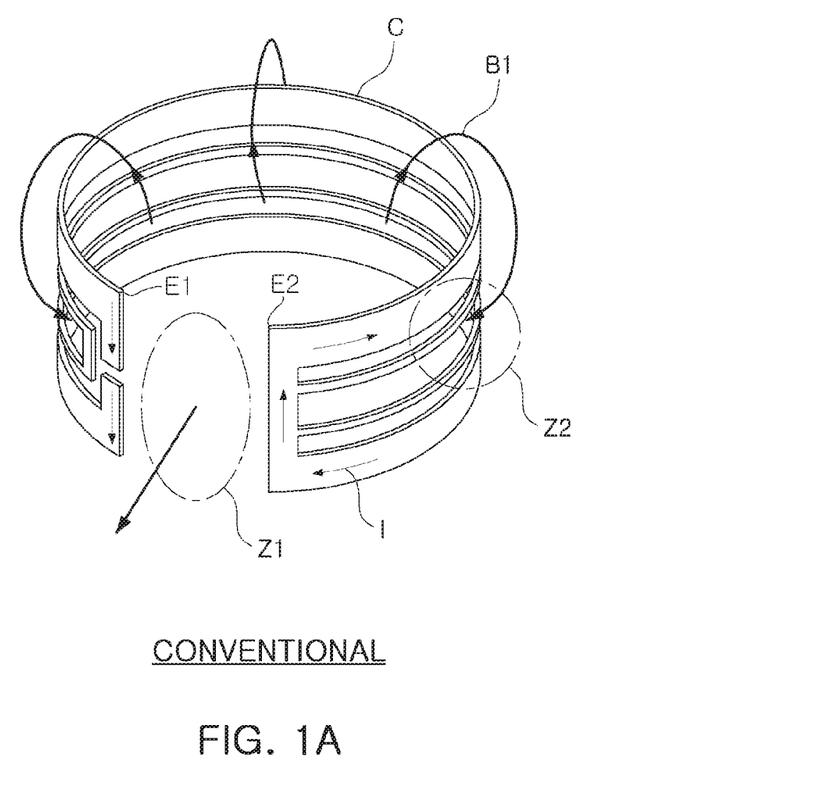
FIGS. 1A and 1B illustrate a conventional technology.
Figure 1B:
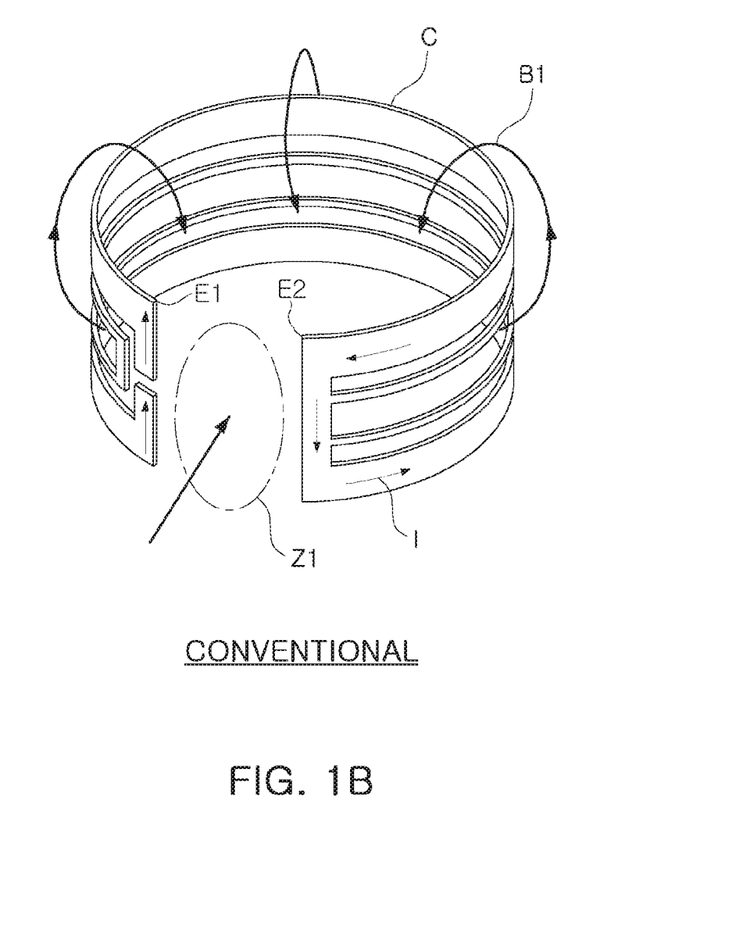

FIGS. 1A and 1B illustrate a wireless power transmitter disclosed in Korean Patent Laid-Open Publication No. 2012-0078995. As shown in FIGS. 1A and 1B, a transmission resonator may include one transmission conductive wire loop C and provide a horizontal magnetic field to the ground surface in a horizontal direction and a vertical magnetic field to the ground surface in a vertical direction using current I flowing through the transmission conductive wire loop C (see B1). In the vertical magnetic field, an electronic device, such as a cellular phone, having a substantially flat charging surface may be charged. In the horizontal magnetic field, an electronic device, such as a Virtual Reality Headset, having a curved charging surface may be charged.

In more detail, in the case of a direction of the current I as shown in FIG. 1A, a reverse direction magnetic field may be generated from the outside of the transmission conductive wire loop C to the inside thereof in a zone Z2, other than a zone Z1 between both ends E1 and E2 of the transmission conductive wire loop C.

Meanwhile, in case of a direction of the current I as shown in FIG. 1B, a reverse direction magnetic field may be generated from the outside of the transmission conductive wire loop C to the inside thereof and a reverse direction magnetic field may be generated from an upper portion of the transmission conductive wire loop C to a lower portion thereof in the zone Z1 between both ends E1 and E2 of the transmission conductive wire loop C.

Such reverse direction magnetic fields may cause problematic malfunctioning of an electronic circuit disposed in an electronic device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a coil structure for wireless power transmissions includes: a body having a cylindrical shape; an upper transmission coil formed on the body and configured to generate an electromagnetic field passing through an upper surface of the body; and at least one side transmission coil formed on the body and configured to generate an electromagnetic field passing through a side surface of the body.

The upper transmission coil may be formed on the upper surface of the body. The coil structure may further include a magnetic shield layer formed in an upper portion of the body below the upper surface of the body, and configured to block the magnetic field generated by the upper transmission coil from propagating toward a lower portion of the body.

The at least one side transmission coil may include: a first side transmission coil disposed around an upper portion of the side surface of the body and configured to generate a first electromagnetic field perpendicular to the side surface of the body; and a second side transmission coil disposed around a lower portion of the side surface of the body and configured to generate a second electromagnetic field perpendicular to the side surface of the body.

The coil structure for wireless power transmissions may further include an insulator configured to prevent a short circuit between a portion of the at least one side transmission coil formed in a vertical direction and a portion of the at least one side transmission coil formed in a horizontal direction.

The coil structure for wireless power transmissions may further include a groove formed in the side surface of the body, wherein: the portion of the at least one side transmission coil formed in the vertical direction and the portion of the at least one side transmission coil formed in the horizontal direction cross each other; and one of the portion of the at least one side transmission coil formed in the vertical direction and the portion of the at least one side transmission coil formed in the horizontal direction is inserted into the groove, and a remaining region of the groove is filled with the insulator.

The at least one side transmission coil may include a single coil by wound around one of an upper portion and a lower portion of the side surface of the body, extending in a vertical direction of the body, wound around the other one of the upper portion and the lower portion of the side surface of the body, and extending in one of the upper portion and the lower portion of the side surface of the body.

A region formed by a portion of the at least one side transmission coil extending in a vertical direction from the upper portion of the side surface of the body to the lower portion and a region formed by a portion of the at least one side transmission coil extending in a vertical direction from the lower portion of the side surface of the body to the upper portion may partially overlap.

The coil structure for wireless power transmissions may further include an insulator configured to prevent a short circuit between a portion of the at least one side transmission coil formed in a vertical direction and a portion of the at least one side transmission coil formed in a horizontal direction.

The insulator may be disposed on top of one of the portion of the at least one side transmission coil formed in the vertical direction and the portion of the at least one side transmission coil formed in the horizontal direction; and the other of the portion of the at least one side transmission coil formed in the vertical direction and the portion of the at least one side transmission coil formed in the horizontal direction may be disposed on top of the insulator.

According to another general aspect, a wireless power transmitter includes: a direct current-alternating current configured to convert a direct current voltage into an alternating current voltage; and a transmission resonator including a wireless power transmission coil structure configured to wirelessly transmit power based on the alternating current voltage converted by the direct current-alternating current converter. The wireless power transmission coil structure includes: a body having a cylindrical shape; an upper transmission coil configured to generate an electromagnetic field passing through an upper surface of the body; and at least one side transmission coil configured to generate at least one electromagnetic field passing through a side surface of the body.

The upper transmission coil may be formed on the upper surface of the body. The coil structure may further include a magnetic shield layer formed in an upper portion of the body below the upper surface of the body, and configured to block the magnetic field generated by the upper transmission coil from propagating toward a lower portion of the body.

The at least one side transmission coil may include: a first side transmission coil disposed around an upper portion of the side surface of the body and configured to generate a first electromagnetic field perpendicular to the side surface of the body; and a second side transmission coil disposed around a lower portion of the side surface of the body and configured to generate a second electromagnetic field perpendicular to the side surface of the body.

The wireless power transmitter may further include an insulator configured to prevent a short circuit between a portion of the at least one side transmission coil formed in a vertical direction and a portion of the at least one side transmission coil formed in a horizontal direction.

The wireless power transmitter may further include a groove formed in the side surface of the body, wherein: the portion of the at least one side transmission coil formed in the vertical direction and the portion of the at least one side transmission coil formed in the horizontal direction cross each other; and one of the portion of the at least one side transmission coil formed in the vertical direction and the portion of the at least one side transmission coil formed in the horizontal direction is inserted into the groove, and a remaining region of the groove is filled with the insulator.

The at least one side transmission coil may include a single coil wound around one of an upper portion and a lower portion of the side surface of the body, extending in a vertical direction of the body, wound around the other one of the upper portion and the lower portion of the side surface of the body, and extending in one of the upper portion and the lower portion of the side surface of the body.

A region formed by a portion of the at least one side transmission coil extending in a vertical direction from the upper portion of the side surface of the body to the lower portion and a region formed by a portion of the at least one side transmission coil extending in a vertical direction from the lower portion of the side surface of the body to the upper portion may partially overlap.

The wireless power transmitter may further include an insulator configured to prevent a short circuit between a portion of the at least one side transmission coil formed in a vertical direction and a portion of the at least one side transmission coil formed in a horizontal direction.

The insulator may be disposed on top of one of the portion of the at least one side transmission coil formed in the vertical direction and the portion of the at least one side transmission coil formed in the horizontal direction; and the other of the portion of the at least one side transmission coil formed in the vertical direction and the portion of the at least one side transmission coil formed in the horizontal direction may be disposed on top of the insulator.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 2:
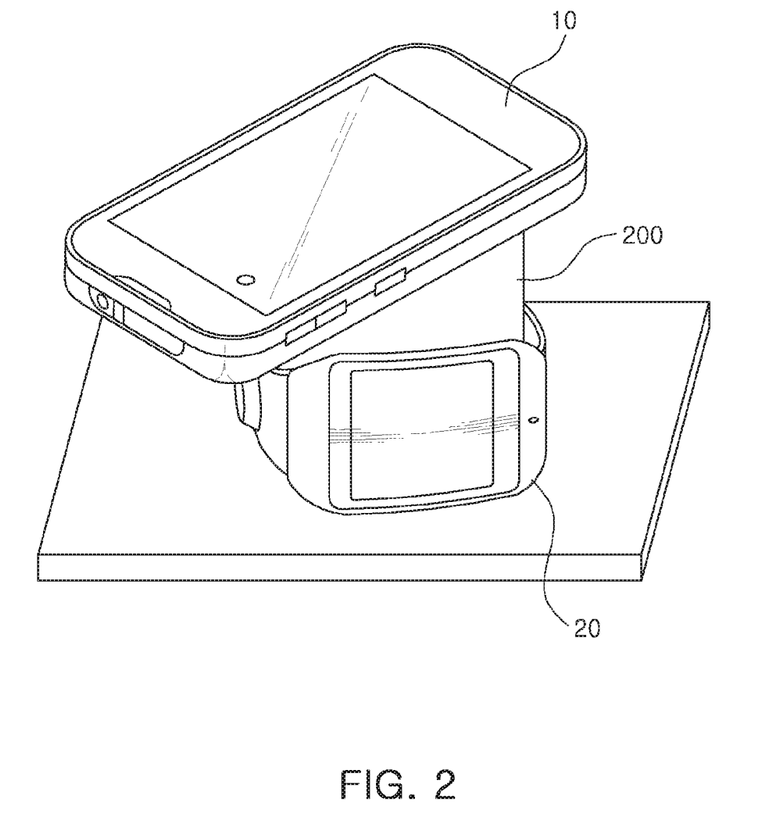
FIG. 2 illustrates an example of using a wireless power transmitter according to an embodiment.

FIG. 2 illustrates an example of using a wireless power transmitter according to an embodiment.

As shown in FIG. 2, an electronic device 10, such as a cellular phone, having a substantially flat charging surface can be arranged on an upper surface of a coil structure 200 for wireless power transmissions of the wireless power transmitter, and an electronic device 20, such as a smart watch or a Virtual Reality Headset, having a curved charging surface can be arranged on a side surface of the coil structure 200 for wireless power transmissions. The coil structure 200 for wireless power transmissions will be described with reference to FIGS. 4 through 6C below.

Figure 3:
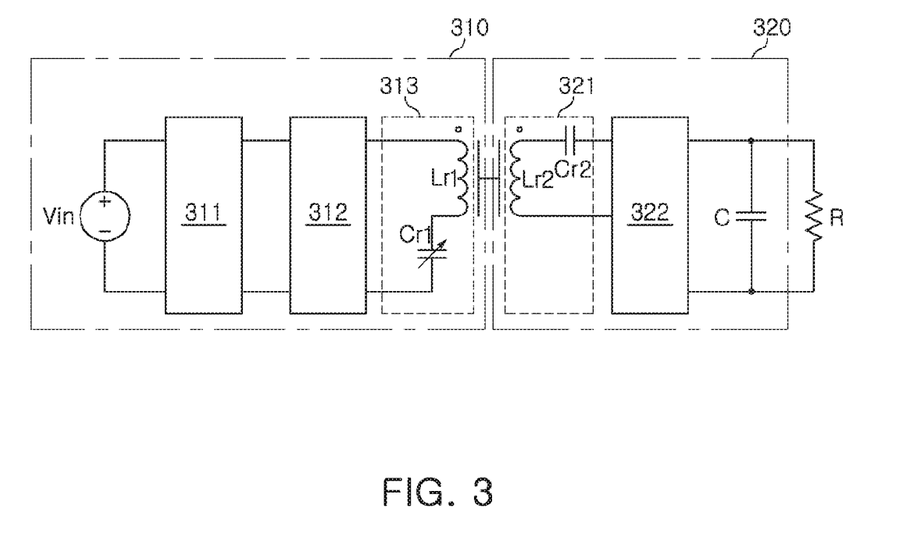
FIG. 3 illustrates configurations of a wireless power transmitter and a wireless power receiver that include a coil structure for wireless power transmissions according to an embodiment.

FIG. 3 illustrates configurations of a wireless power transmitter 310 and a wireless power receiver 320 that include the coil structure 200 for wireless power transmissions according to an embodiment.

As shown in FIG. 3, the wireless power transmitter 310 includes input power Vin, a direct current-direct current converter 311 that varies a level of the input power Vin and outputs the input power Vin, a direct current-alternating current converter 312 that converts a direct current voltage output by the direct current-direct current converter 311 into an alternating current voltage for wireless power transmissions, and a transmission resonator 313 that transmits power wirelessly based on the alternating current voltage converted by the direct current-alternating current converter 312. The transmission resonator 313 includes a transmitter coil Lr1 and a variable capacitor Cr1 for adjusting a resonance frequency.

The above-described transmission resonator 313 includes the coil structure 200 for wireless power transmissions for implementing the transmitter coil Lr1 shown in FIG. 3. A detailed structure of the coil structure 200 for wireless power transmissions will be described with reference to FIGS. 4 through 6C below.

The wireless power receiver 320 includes a receiving resonator 321 that is magnetically coupled with the transmission resonator 313, receives the power wirelessly transmitted from the transmission resonator 313, and outputs the received power as a voltage, a rectifier 322 that rectifies the voltage output by the receiving resonator 321, and a capacitor C that stores the voltage rectified by the rectifier 322. The above-described receiving resonator 321 includes a receiver coil Lr2 and a variable capacitor Cr2. The reference character R denotes a load such as a battery.

Figure 4:
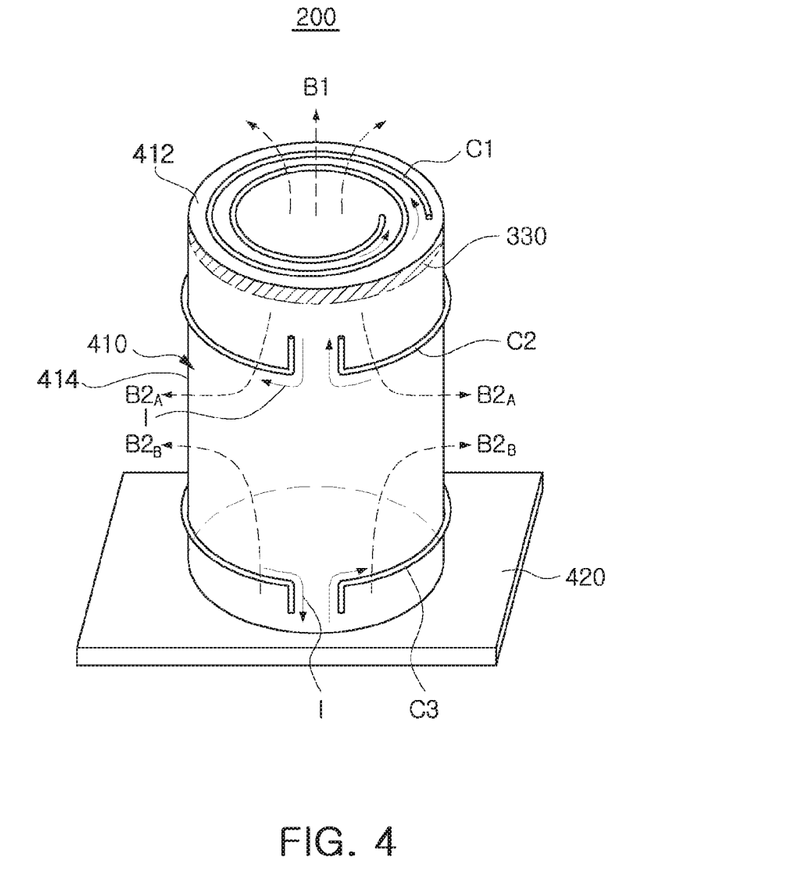
FIG. 4 illustrates a coil structure for wireless power transmissions according to an embodiment.

FIG. 4 illustrates the coil structure 200 for wireless power transmissions according to an embodiment.

Referring to FIG. 4, the coil structure 200 for wireless power transmissions includes a body 410 having a cylindrical shape and transmission coils C1, C2 and C3 that are formed on the body 410 and are configured to generate electromagnetic fields B1 and B2. The upper transmission coil C1 is configured to generate the electromagnetic field B1 that passes through an upper surface 412 of the body 410. The first and second side transmission coils C2 and C3 are configured to generate electromagnetic fields $B2_A$ and $B2_B$, respectively, that pass through a side surface 414 of the body 410 and combine to form the electromagnetic field B2. A current I flows through the coils C1, C2 and C3. A support 420 is used to support the body 410.

The electronic device 10 (FIG. 2) which has a substantially flat charging surface can be charged by the magnetic field B1 perpendicular to the upper surface 412 of the body 410. The electronic device 20 (FIG. 2) which has a curved charging surface can be charged by the magnetic field B2 perpendicular to the side surface 414 of the body 410.

The body 410 may have a cylindrical shape, e.g., a cylindrical column shape. The upper transmission coil C1 is wound around the upper surface 412 of the body 410 at least one time to form the magnetic field B1 perpendicular to the upper surface of the body 410. The first and second side transmission coils C2 and C3 are wound around the side surface 414 of the body 410 at least one time to form the magnetic fields B2 perpendicular to the side surface of the body 410.

The first side transmission coil C2 and the second side transmission coil C3 may be formed independently of each other. In more detail, the first side transmission coil C2 is formed to surround a side upper portion of the body 410 to generate the magnetic field $B2_A$ perpendicular to the side surface 414 of the body 410, and the second side transmission coil C3 is formed to surround a side lower portion of the body 410 to generate the magnetic field $B2_B$ perpendicular to the side surface 414 of the body 410.

A magnetic shield layer 330 is formed in an upper portion of the body 410 below the upper surface 412 of the body 410 in order to block the magnetic field B1 generated by the upper transmission coil C1 from propagating toward the lower portion of the body 410.

As described above, the upper transmission coil C1 generating the electromagnetic field B1 perpendicular to the upper surface 412 of the body 410 having a cylindrical shape may be formed independently of the side transmission coils C2 and C3 generating the electromagnetic field B2 perpendicular to the side surface 414 of the body 410 (and vice versa), thereby preventing reverse direction magnetic fields from being generated in the upper and side surfaces 412 and 414 of the body 410. Thus, malfunctioning of an electronic circuit disposed in an electronic device can be reduced.

Additionally, the first side transmission coil C2 generating the electromagnetic field $B2_A$ perpendicular to the side surface 414 of the body 410 and the second side transmission coil C3 generating the electromagnetic field $B2_B$ perpendicular to the side surface 414 of the body 410 are formed independently of each other, thereby preventing a reverse direction magnetic field from being generated in the side surface 414 of the body 410. Thus, malfunctioning of an electronic circuit disposed in an electronic device can be reduced.

FIGS. 5A through 5D illustrate the coil structure 200' for wireless power transmissions according to another embodiment. Unlike FIG. 4, the first and second side transmission coils C2' and C3' are configured to wind around the body 410 at least two times.

Figure 5A:
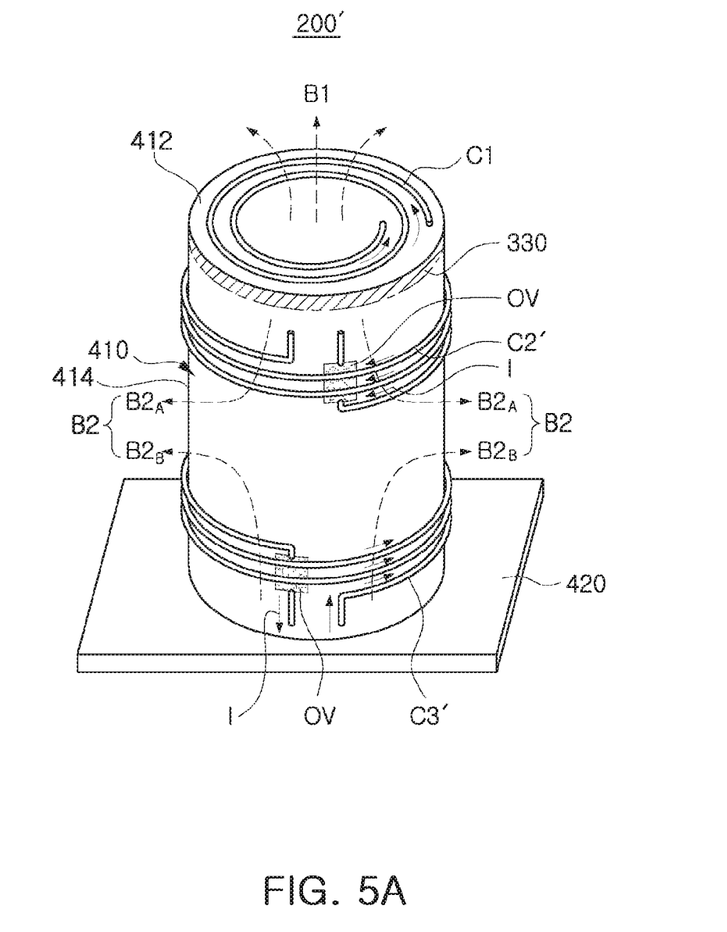
FIGS. 5A through 5D illustrate a coil structure for wireless power transmissions according to another embodiment.

In more detail, as shown in FIG. 5A, the first side transmission coil C2' is formed to wind around the side upper portion of the body 410 at least two times to generate the magnetic field $B2_A$ perpendicular to the side surface 414 of the body 410. The second side transmission coil C3' is formed to wind around the side lower portion of the body 410 at least two times to generate the magnetic field $B2_B$ perpendicular to the side surface 414 of the body 410.

Because the first and second side transmission coils C2' and C3' wind around the body 410 at least twice, a portion of the coil C2'/C3' formed in a vertical direction and a portion of the coil C2'/C3' formed in a horizontal direction overlap, which may cause a short-circuit.

Figure 5B:
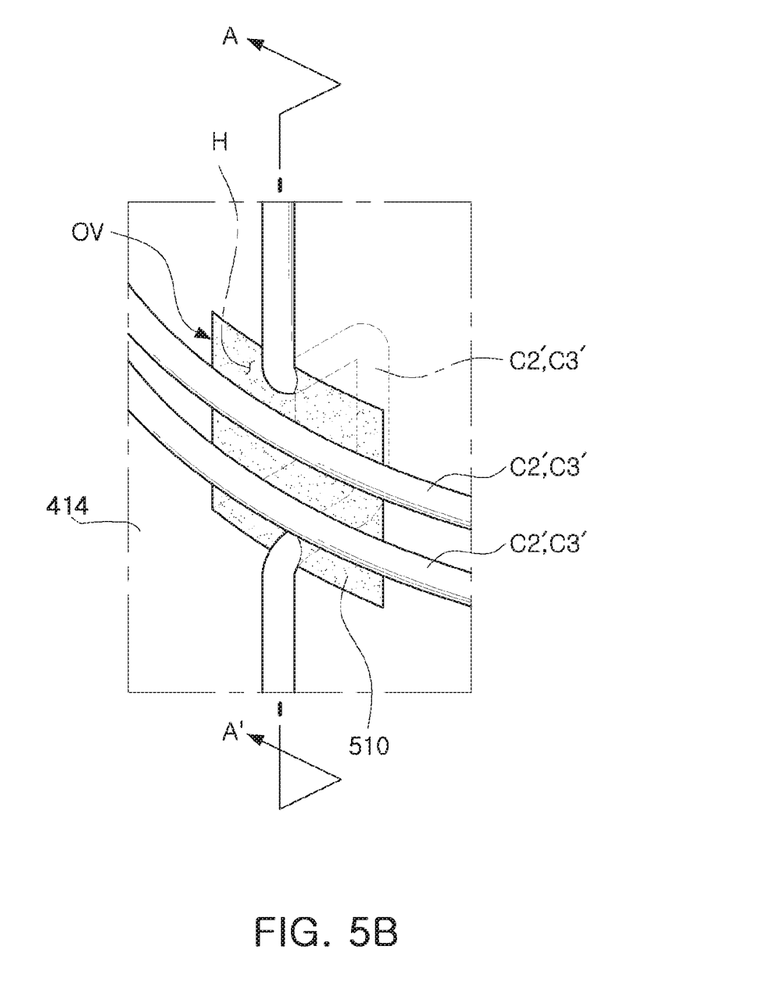
Figure 5C:
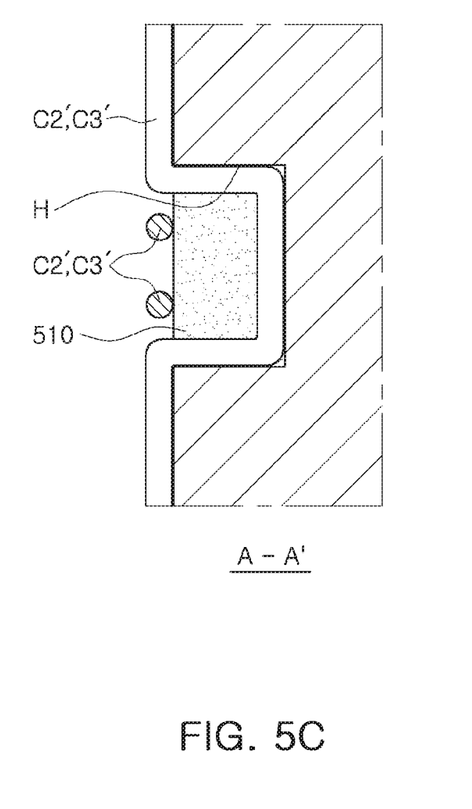

Therefore, to prevent such a short-circuit between coils, as shown in FIGS. 5B and 5C, a groove H is formed in a predetermined region OV of the side surface 414 of the body 410 at which the short-circuit between vertical and horizontal portions of the coils C2' and C3' may occur, then one of the portion of the coil C2'/C3' formed in the vertical direction and the portion of the coil C2'/C3' formed in the horizontal direction is inserted into the groove H, and then a remaining region of the groove H is filled with an insulator 510. The other of the portion of the coil C2'/C3' formed in the vertical direction and the portion of the coil C2'/C3' formed in the horizontal direction is provided on top of the insulator 510.

Figure 5D:
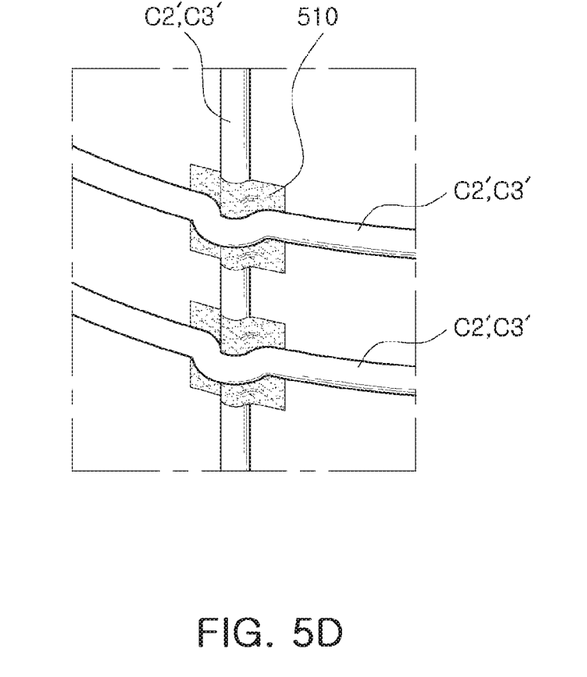

According to another embodiment, as shown in FIG. 5D, the insulator 510 is applied on top of one of the portion of the coil C2'/C3' formed in the vertical direction and the portion of the coil C2'/C3' formed in the horizontal direction, and then the other of the portion of the coil C2'/C3' formed in the vertical direction and the portion of the coil C2'/C3' formed in the horizontal direction is applied on top of the insulator 510.

Similar to the coil structure 200 shown in FIG. 4, the magnetic shield layer 330 is formed in an upper portion of the body 410 below the upper surface 412 in order to block the magnetic field B1 generated by the upper transmission coil C1 from propagating toward the lower portion of the body 410 (see FIG. 5A).

Figure 6A:
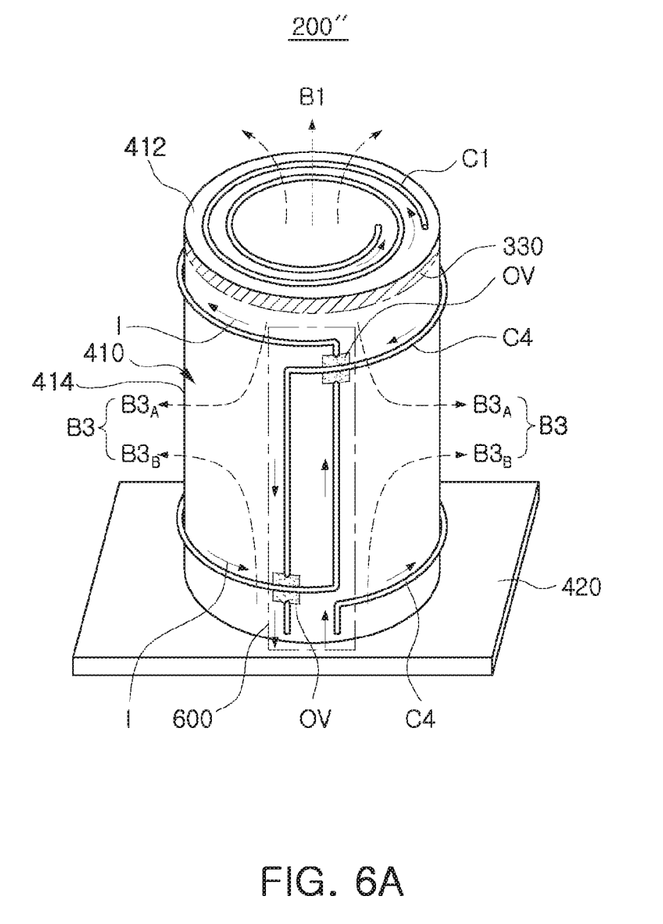
FIGS. 6A through 6C illustrate a coil structure for wireless power transmissions according to yet another embodiment.
Figure 6B:
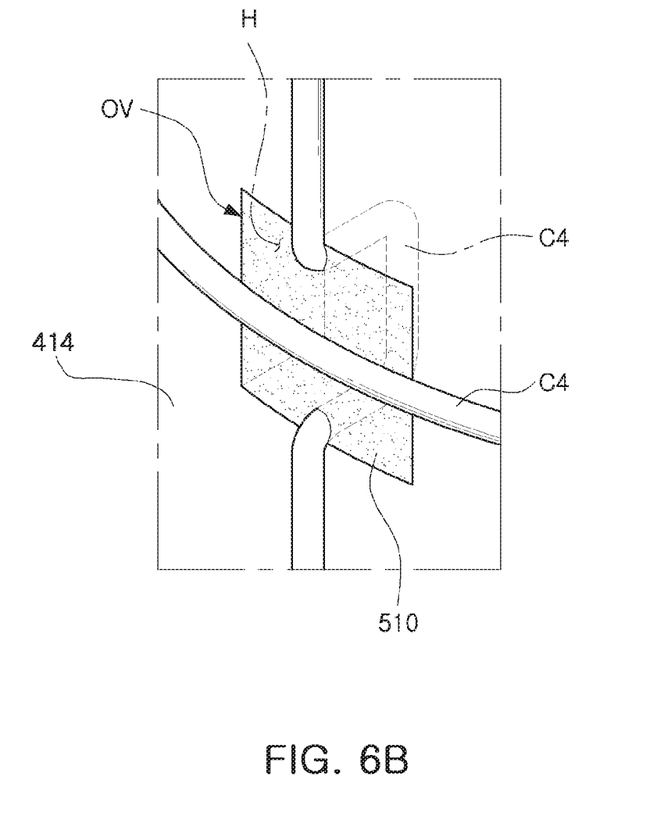
Figure 6C:
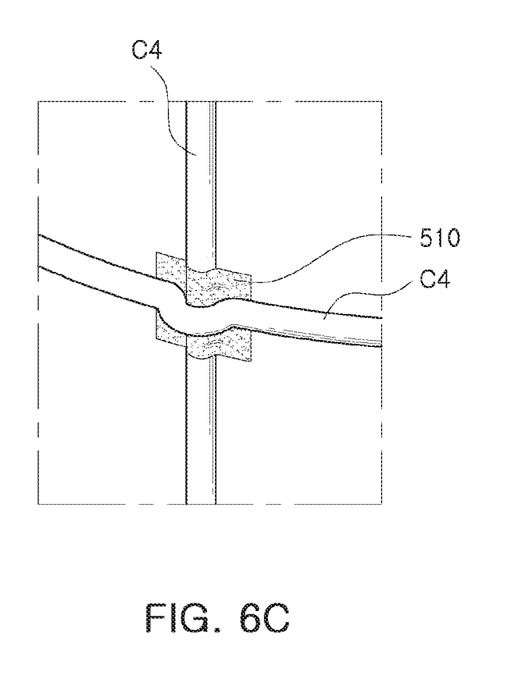

FIGS. 6A through 6C illustrate a coil structure 200" for wireless power transmissions according to another embodiment. Unlike the embodiment of FIG. 4, a side transmission coil C4 is configured as a single coil in the coil structure 200".

In more detail, as shown in FIG. 6A, the side transmission coil C4 is configured as a single coil by winding the side transmission coil C4 around one of an upper portion and a lower portion of the side surface 414 of the body 410, extending the side transmission coil C4 in a vertical direction of the body 410, winding the transmission coil C4 around the other one of the upper portion and the lower portion of the side surface 414 of the body 410, and extending the side transmission coil C4 in one of the upper portion and the lower portion of the side surface of the body 410.

The side transmission coil C4 is configured to generate a magnetic field B3 that passes through a side surface 414 of the body 410. The magnetic field B3 is formed by the combination of magnetic fields $B3_A$ and $B3_B$ that are perpendicular to the side surface 414 of the body 410, and are respectively generated by upper and lower portions of the side transmission coil C4.

Although the upper portion or the lower portion of the side surface of the body 410 is wound with the side transmission coil C4 only one time in FIG. 6A, similar to FIG. 5A, the side transmission coil C4 may be wound around the upper portion and the lower portion of the side surface 414 of the body 410 at least two times.

In particular, a region formed by a portion of the coil C4 extending in the vertical direction from the upper portion of the side surface 414 to the lower portion of the side surface 414 and a region formed by a portion of the coil C4 extending in a vertical direction from the lower portion of the side surface 414 to the upper portion of the side surface 414 may partially overlap (see 600).

According to the configuration shown in FIG. 1B, a reverse magnetic field generated in the zone Z1 between both ends E1 and E2 of a coil may be originally blocked. However, the side transmission coil C4 is configured as a single coil, and thus a portion of the coil C4 formed in the vertical direction and a portion of the coil C4 formed in the horizontal direction overlap, which may cause a short-circuit.

Therefore, to prevent such short-circuit between portions of the coil C4, as shown in FIG. 6B, the groove H is formed in the predetermined region OV of the side surface 414 at which the short-circuit between the portions of the coil C4 may occur, then one of the portion of the coil C4 formed in the vertical direction and the portion of the coil C4 formed in the horizontal direction is inserted into the groove H, and then a remaining region of the groove H is filled with the insulator 510. The other of the portion of the coil C4 formed in the vertical direction and the portion of the coil C4 formed in the horizontal direction is applied on top of the insulator 510.

Alternatively, according to another embodiment, as shown in FIG. 6C, the insulator 510 is applied on top of one of the portion of the coil C4 formed in the vertical direction and the portion of the coil C4 formed in the horizontal direction, and then the other of the portion of the coil C4 formed in the vertical direction and the portion of the coil C4 formed in the horizontal direction is applied on top of the insulator 510.

Similar to FIG. 4, the magnetic shield layer 330 is formed in an upper portion of the body 410 below the upper surface 412 of the body 410 in order to block the magnetic field B1 generated by the upper transmission coil C1 from propagating toward the lower portion of the body 410.

According to example embodiments disclosed herein, an upper transmission coil generating an electromagnetic field perpendicular to an upper surface of a body having a cylindrical shape and a side transmission coil generating an electromagnetic field perpendicular to a side surface of the body are independently formed, thereby preventing reverse direction magnetic fields from being generated in the upper and side surfaces of the body. Thus, malfunctioning of an electronic circuit disposed in an electronic device may be reduced.

According to other example embodiments, a first side transmission coil generating an electromagnetic field perpendicular to a side surface of a body and a second side transmission coil generating an electromagnetic field perpendicular to the side surface of the body are independently formed, thereby preventing a reverse direction magnetic field from being generated in the side surface of the body. Accordingly, malfunctioning of an electronic circuit disposed in an electronic device may be reduced.

The apparatuses, units, modules, devices, and other components (e.g., the current converters 311 and 312, and the rectifier 322) illustrated in FIG. 3 are implemented by hardware components. Examples of hardware components include controllers, sensors, generators, drivers, and any other electronic components known to one of ordinary skill in the art.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil structure for wireless power transmissions comprising:
a body comprising an upper surface and a side surface extending from the upper surface;
an upper transmission coil disposed on the upper surface and configured to generate an electromagnetic field passing through the upper surface;
at least one side transmission coil wound around a perimeter of the side surface and configured to generate an electromagnetic field passing through the side surface; and
a magnetic shield layer formed in an upper portion of the body below the upper surface, and configured to block the magnetic field generated by the upper transmission coil from propagating toward a lower portion of the body.

2. The coil structure for wireless power transmissions of claim 1, wherein the at least one side transmission coil comprises
a first side transmission coil disposed around an upper portion of the side surface and configured to generate a first electromagnetic field perpendicular to the side surface, and
a second side transmission coil disposed around a lower portion of the side surface and configured to generate a second electromagnetic field perpendicular to the side surface.

3. The coil structure for wireless power transmissions of claim 2, further comprising an insulator configured to prevent a short circuit between a portion of the at least one side transmission coil formed in a vertical direction and a portion of the at least one side transmission coil formed in a horizontal direction.

4. The coil structure for wireless power transmissions of claim 3, further comprising a groove formed in the side surface, wherein
the portion of the at least one side transmission coil formed in the vertical direction and the portion of the at least one side transmission coil formed in the horizontal direction cross each other,
one of the portion of the at least one side transmission coil formed in the vertical direction and the portion of the at least one side transmission coil formed in the horizontal direction is inserted into the groove, and
a remaining region of the groove is filled with the insulator.

5. The coil structure for wireless power transmissions of claim 1, wherein the at least one side transmission coil comprises a single coil by wound around one of an upper portion and a lower portion of the side surface, extending in a vertical direction of the body, wound around the other one of the upper portion and the lower portion of the side surface, and extending in one of the upper portion and the lower portion of the side surface.

6. The coil structure for wireless power transmissions of claim 5, wherein a region formed by a portion of the at least one side transmission coil extending in the vertical direction from the upper portion of the side surface to the lower portion of the side surface and a region formed by a portion of the at least one side transmission coil extending in the vertical direction from the lower portion of the side surface to the upper portion of the side surface partially overlap.

7. The coil structure for wireless power transmissions of claim 5, further comprising an insulator configured to prevent a short circuit between a portion of the at least one side transmission coil formed in the vertical direction and a portion of the at least one side transmission coil formed in a horizontal direction of the body.

8. The coil structure for wireless power transmissions of claim 7, wherein
the insulator is disposed on top of one of the portion of the at least one side transmission coil formed in the vertical direction and the portion of the at least one side transmission coil formed in the horizontal direction, and
the other of the portion of the at least one side transmission coil formed in the vertical direction and the portion of the at least one side transmission coil formed in the horizontal direction is disposed on top of the insulator.

9. A wireless power transmitter comprising:
a direct current-alternating current converter configured to convert a direct current voltage into an alternating current voltage; and
a transmission resonator comprising a wireless power transmission coil structure configured to wirelessly transmit power based on the alternating current voltage converted by the direct current-alternating current converter,
wherein the wireless power transmission coil structure comprises
a body comprising an upper surface and a side surface extending from the upper surface,
an upper transmission coil disposed on the upper surface and configured to generate an electromagnetic field passing through the upper surface,
at least one side transmission coil wound around a perimeter of the side surface and configured to generate an electromagnetic field passing through the side surface, and
a magnetic shield layer formed in an upper portion of the body below the upper surface, and configured to block the magnetic field generated by the upper transmission coil from propagating toward a lower portion of the body.

10. The wireless power transmitter of claim 9, wherein the at least one side transmission coil comprises
a first side transmission coil disposed around an upper portion of the side surface and configured to generate a first electromagnetic field perpendicular to the side surface, and
a second side transmission coil formed to surround a lower portion of the side surface and configured to generate a second electromagnetic field perpendicular to the side surface.

11. The wireless power transmitter of claim 10, further comprising an insulator configured to prevent a short circuit between a portion of the at least one side transmission coil formed in a vertical direction and a portion of the at least one side transmission coil formed in a horizontal direction.

12. The wireless power transmitter of claim 11, further comprising a groove formed in the side surface, wherein
the portion of the at least one side transmission coil formed in the vertical direction and the portion of the at least one side transmission coil formed in the horizontal direction cross each other,
one of the portion of the at least one side transmission coil formed in the vertical direction and the portion of the at least one side transmission coil formed in the horizontal direction is inserted into the groove, and
a remaining region of the groove is filled with the insulator.

13. The wireless power transmitter of claim 9, wherein the at least one side transmission coil comprises a single coil wound around one of an upper portion and a lower portion of the side surface, extending in a vertical direction of the body, wound around the other one of the upper portion and the lower portion of the side surface, and extending in one of the upper portion and the lower portion of the side surface.

14. The wireless power transmitter of claim 13, wherein a region formed by a portion of the at least one side transmission coil extending in the vertical direction from the upper portion of the side surface to the lower portion of the side surface and a region formed by a portion of the at least one side transmission coil extending in the vertical direction from the lower portion of the side surface to the upper portion of the side surface partially overlap.

15. The wireless power transmitter of claim 13, further comprising an insulator configured to prevent a short circuit between a portion of the at least one side transmission coil formed in the vertical direction and a portion of the at least one side transmission coil formed in a horizontal direction of the body.

16. The wireless power transmitter of claim 15, wherein
the insulator is disposed on top of one of the portion of the at least one side transmission coil formed in the vertical direction and the portion of the at least one side transmission coil formed in the horizontal direction, and
the other of the portion of the at least one side transmission coil formed in the vertical direction and the portion of the at least one side transmission coil formed in the horizontal direction is disposed on top of the insulator.

* * * * *